(12) United States Patent
Cody et al.

(10) Patent No.: US 7,756,373 B2
(45) Date of Patent: Jul. 13, 2010

(54) FIBER OPTIC CABLE ASSEMBLY WITH FLOATING TAP

(75) Inventors: Joseph T. Cody, Hickory, NC (US); Dennis M. Knecht, Hickory, NC (US); Christopher P. Lewallen, Hudson, NC (US); James P. Luther, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 12/229,985

(22) Filed: Aug. 28, 2008

(65) Prior Publication Data
US 2010/0054679 A1    Mar. 4, 2010

(51) Int. Cl.
G02B 6/44    (2006.01)
(52) U.S. Cl. .................................. 385/113; 385/114
(58) Field of Classification Search ............ 385/95–114
See application file for complete search history.

(56) References Cited

U.S. PATENT DOCUMENTS

| | | | | |
|---|---|---|---|---|
| 5,121,458 | A * | 6/1992 | Nilsson et al. | 385/100 |
| 7,016,592 | B2 * | 3/2006 | Elkins et al. | 385/136 |
| 7,327,943 | B2 * | 2/2008 | Vo et al. | 386/100 |
| 7,424,189 | B2 * | 9/2008 | Lu et al. | 385/100 |
| 7,450,804 | B2 | 11/2008 | Elkins, II et al. | 385/100 |
| 7,469,091 | B2 * | 12/2008 | Mullaney et al. | 385/139 |
| 7,515,796 | B2 * | 4/2009 | Cody et al. | 385/100 |
| 7,660,501 | B2 * | 2/2010 | Elkins et al. | 385/100 |
| 2008/0145008 | A1 | 6/2008 | Lewallen et al. | 385/100 |
| 2008/0247719 | A1 | 10/2008 | Cody et al. | 385/114 |

\* cited by examiner

*Primary Examiner*—Daniel Petkovsek

(57) ABSTRACT

A fiber optic cable assembly with a floating tap is disclosed, wherein the assembly comprises a fiber optic cable having a cable fiber assembly, such as in the form of a ribbon stack. The assembly includes at least one network access point (NAP) for accessing at least one cable fiber in the cable fiber assembly and at least one strength area for example a strength member. At least one cable fiber is extracted from the cable fiber assembly and held by a transition assembly. A buffer conduit loosely contains the at least one cable fiber and guides it to an intermediate buffer conduit, which in turn guides the at least one cable fiber to a splice tube. The intermediate buffer conduit can translate relative to the splice tube. At least one tether fiber is spliced to the at least one cable fiber. Alternatively, the at least one cable fiber has sufficient length to serve as the at least one tether fiber so that splicing to another fiber is not required. Each strength member is covered by a movable member. A bonding structure bonds the cable fiber assembly, buffer conduit and movable member so that the cable fiber assembly can translate but not rotate relative to the cable within the NAP. This allows the tap point to "float" within the NAP when the cable fiber assembly needs to translate within the cable.

14 Claims, 12 Drawing Sheets

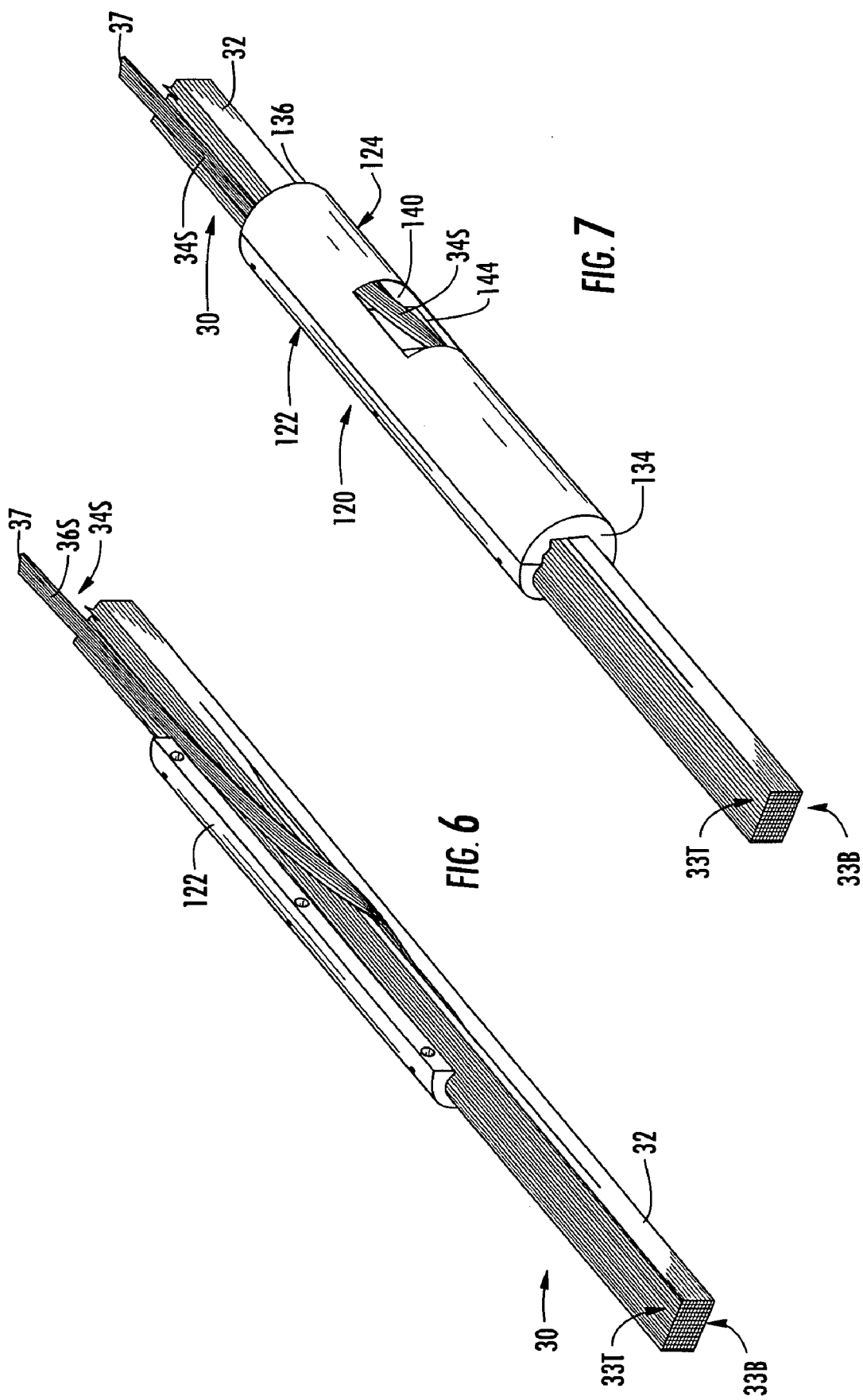

FIBER OPTIC CABLE ASSEMBLY WITH FLOATING TAP

BACKGROUND OF THE INVENTION

1. Field of the Invention

The present invention relates generally to fiber optic cable assemblies deployed in fiber to the premises applications, and more specifically, to fiber optic cable assemblies including at least one network access point and methods for securing the collection of fibers at the network access point to allow for translation of the fibers without rotation.

2. Technical Background

Fiber optic networks are being expanded to provide voice, video, data and other services to subscribers. As a result, different cable types are being used to span both the long and short transmission distances. For kilometer length distribution cables, for example, these cables typically include one or more network access points along the cable length at which pre-selected optical fibers are accessed and preterminated to provide a branch off of the distribution cable. These network access points or "NAPs" are also referred to as "mid-span access locations" or "tap points" where preterminated optical fibers are spliced or otherwise optically connected to tether or drop cables. The types of networks in which cable assemblies are being developed are often referred to as "FTTx" networks, where "FTT" stands for "Fiber-to-the" and "x" generically describes an end location, such as "H" for "home."

Certain cables that carry collections of fibers ("cable fiber assemblies) such as in the form of ribbon stacks and helically stranded buffer tubes present unique challenges for accessing and tapping. Specifically, challenges in how the access is performed, how the fibers are terminated, how the remaining uncut optical fibers or ribbons are handled, and how the cable performs over time and under stress. There are also challenges in mid-span accessing the cable fibers therein.

One type of fiber optical cable is a ribbon cable such as the Standard Single-Tube Ribbon (SST-Ribbon™) cable available from Corning Cable Systems of Hickory, N.C. This particular cable is helically wound and the cable fiber assembly comprises identifiable 12-fiber or 24-fiber ribbons in a filled buffer tube. Dielectric or steel rods are placed about 180 degrees apart in the cable's jacket to provide the required tensile strength for armored and dielectric constructions, respectively. This cable exhibits excellent water-blocking performance and is jacketed with a polyethylene outer jacket, and armored versions of the cable include a copolymer-coated steel tape armoring.

Another type of ribbon cable currently available includes the SST-Ribbon™ Gel-Free Cable also available from Corning Cable Systems of Hickory, N.C. The cable fiber assembly includes a single buffer tube that contains a stack of up to eighteen 12-fiber ribbons wrapped within a water-swellable foam tape. This central buffer tube is surrounded by a second water-swellable tape. Dielectric or steel strength members are located 180 degrees apart under the cable jacket to provide tensile and anti-buckling strength. The cable sheath is jacketed with a black UV-resistant polyethylene sheath and armored versions of the cable include a copolymer-coated corrugated steel tape armor layer. This cable can provide, for example, about 216 fibers in a compact design that can fit within a 1.0 inch inner diameter or larger inner-duct. Coupling features ensure that the ribbon stack and cable act as one unit, providing long-term reliability in aerial, duct and direct-buried applications and minimizing ribbon movement in situations where cable vibration may occur.

Such cables are typically used as trunk cables that provide an end-to-end connection rather than for providing mid-span access. The formation of mid-span NAPs is problematic in that spooling of such cables creates both a translation and twisting (torsion) of the ribbon stack carried within the cable. This would cause fixed NAPs to translate and twist and thus damage the ribbon stack at the NAP.

What is desired is a fiber optic cable assembly having at least one NAP and wherein the distribution cable is of a type including a cable fiber assembly that includes, for example, stack of optical fiber ribbons, such as the cable types described above. A desirable fiber optic cable assembly would provide structure or material for handling both the uncut fibers in the cable fiber assembly (e.g., ribbon stack) as well as the preterminated cable fibers (e.g., fiber ribbons). Further, what is desired are methods of creating NAPs along a fiber optic cable that allows for translation but not rotation of the cable fiber assembly.

SUMMARY OF THE INVENTION

A first aspect of the invention is a fiber optic cable assembly that includes a fiber optic cable that carries a cable fiber assembly and at least one strength member therein. The fiber optic cable assembly includes at least one network access point (NAP) positioned along the fiber optic cable at which at least a portion of at least one fiber the cable fiber assembly is contained (and preferably loosely confined) within a buffer conduit, and wherein at least one movable member is operably engaged with the least one strength member. A bonding structure is formed within the NAP and configured to secure the cable fiber assembly to the at least one movable member and the buffer conduit so as to substantially prevent rotation of the cable fiber assembly relative to the cable while allowing for translation of the cable fiber assembly relative to the cable within the NAP. The at least one cable fiber from the cable fiber assembly that is confined within the buffer conduit can serve as at least on tether fiber if the at least one cable fiber is sufficiently long. Alternatively, at least one separate tether fiber can be spliced to the at least one cable fibers.

A second aspect of the invention is a method of forming a fiber optic cable assembly. The method comprises providing a fiber optic cable having at least one strength member and a cable fiber assembly comprising a plurality of cable fibers. The method also includes accessing, at a mid-span NAP, at least one cable fiber and the least one strength member, and operably engaging at least one movable member with the at least one strength member. The method further includes disposing a portion of the at least one cable fiber in a buffer conduit so as to be loosely contained therein. The method also includes bonding the cable fiber assembly, buffer conduit and the at least one movable member in a bonding structure that allows the cable fiber assembly to translate but not rotate relative to the cable within the NAP.

A third aspect of the invention is a fiber optic cable assembly that includes a fiber optic cable having at least one strength member and a ribbon stack that includes multiple fiber ribbons each having multiple cable fibers. The assembly includes a NAP positioned along the fibber optic cable at a mid-span location and at which at least a section of one fiber ribbon is extracted from the ribbon stack and preterminated. A buffer conduit is arranged so as to loosely confine a first portion of the preterminated fiber ribbon section. An intermediate guide tube is connected to the buffer conduit and loosely confines a second portion of the preterminated fiber ribbon section. A splice tube having an interior is connected to the intermediate guide tube such that the intermediate guide tube is translatable relative to the fiber optic cable. At least one movable member such as a sleeve is operably engaged with the at least one strength member so as to be movable relative thereto. A tether having a tether fiber ribbon containing tether fibers, wherein the tether fibers and cable fibers are optically connected within the splice tube interior. A bonding structure is formed within the NAP and is configured to lock the ribbon stack to the at least one movable member and the buffer conduit so as to substantially prevent ribbon stack rotation at the NAP relative to the cable while allowing for ribbon stack translation relative to the cable at the NAP.

Additional features and advantages of the invention will be set forth in the detailed description that follows, and in part will be readily apparent to those skilled in the art from that description or recognized by practicing the invention as described herein, including the detailed description that follows, the claims, as well as the appended drawings. It is to be understood that both the foregoing general description and the following detailed description present exemplary embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the detailed description, serve to explain the principles and operations thereof.

BRIEF DESCRIPTION OF THE DRAWINGS

FIG. 6 is similar to FIG. 4 and illustrates a first step in using the transition assembly of FIG. 5 to secure the ribbon stack and the splice ribbon section;

FIG. 7 is similar to FIG. 6 and shows the transition assembly in place around the ribbon stack;

DETAILED DESCRIPTION OF THE INVENTION

Figure 1:
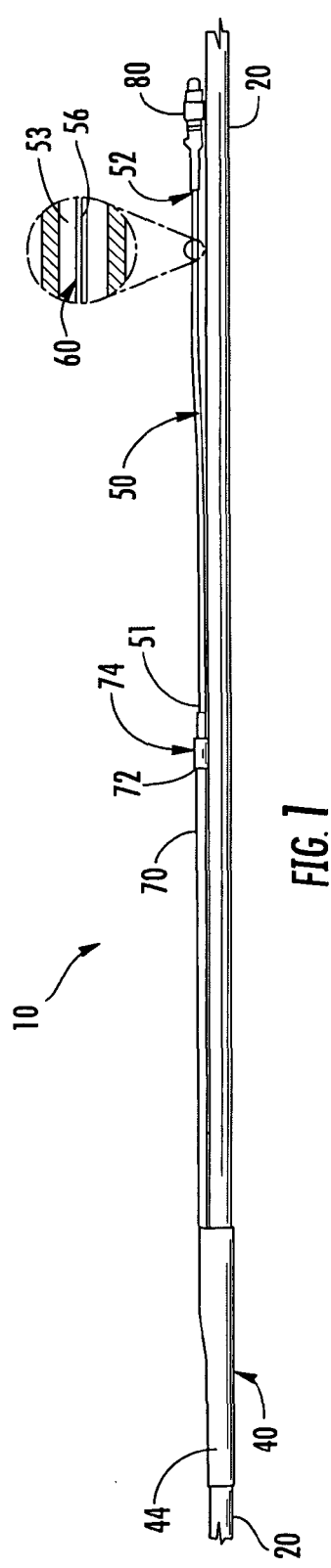
FIG. 1 is a perspective view of an example embodiment of fiber optic cable assembly according to the present invention.
Figure 2:
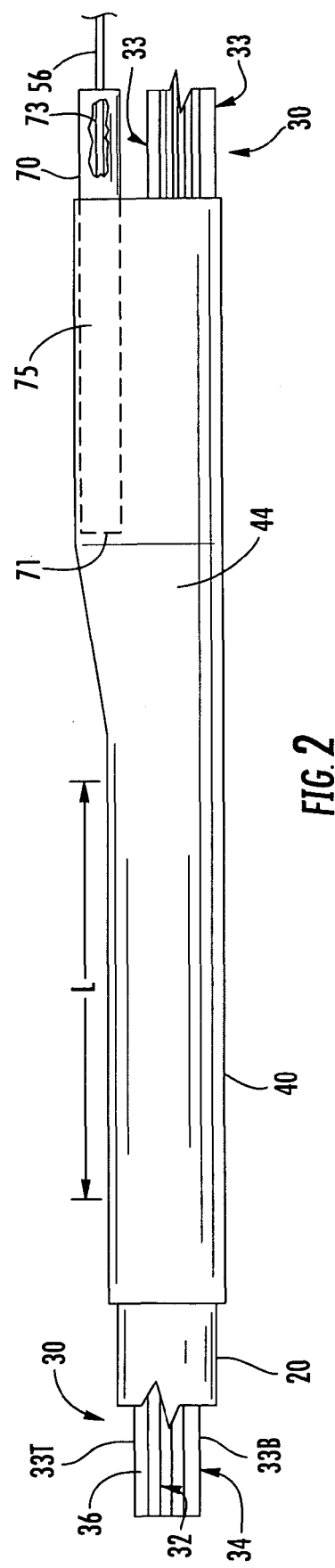
FIG. 2 is a perspective close-up view of the flexible NAP portion of the fiber optic cable assembly of FIG. 1.

Referring to FIGS. 1 and 2, the present invention provides cable assemblies for both indoor and outdoor applications and that have at least one flexible NAP that include a moveable or "floating tap." Although only a portion of an entire fiber optic cable assembly is shown in some of the Figures, a fiber optic cable assembly of the present invention includes a distribution cable that carries a collection of cable fibers (referred to herein as a "cable fiber assembly") and that has one or more network access points positioned at mid-span locations along the cable length. Flexible network access points have some degree of flexibility to facilitate cable storage and installation and are used as tether or drop cable attachment points for branching preterminated optical fibers of the cable. As discussed in greater detail below, the ability of the cable fiber assembly to translate along the length of the cable within the network access point allows the tap formed therein to move or "float" within the NAP. The present invention is of particular importance in forming taps at NAPs in fiber optic distribution cables having cable fiber assemblies with configurations that create tension and/or stress in the cable fiber assembly when handling, storing or other adjusting and/or distributing the distribution cable.

FIGS. 1 and 2 illustrate an example embodiment of a fiber optic cable assembly 10 that includes a distribution cable 20 that carries a cable fiber assembly 30 comprising a plurality of optical fibers 36. In an example embodiment, cable fiber assembly 30 is in the form of a ribbon stack made up of at least one fiber ribbon 34, which in turn is made up of two or more optical fibers 36. Optical fibers 36 are referred to hereinafter as "cable fibers" to denote the fact they originate from cable 20. Terminated cable fibers have ends 37.

Cable fiber assembly 30 may be any one of a number of fiber collections or "cable fiber assemblies" including non-ribbon type arrangements that include helically stranded buffer tubes that contain one or more optical fibers 36. However, a cable fiber assembly 30 in the form of a ribbon stack is used hereinafter to illustrate the principles of the invention and so the cable fiber assembly is referred to hereinafter as "ribbon stack" 30 for ease of discussion.

Ribbon stack 30 includes opposite edges 32 and top and bottom surfaces 33T and 33B. Fiber optic cable assembly 10 also includes a network access point or "NAP" 40 covered with flexible covering 44 substantially enclosing or encapsulating the NAP. Suitable coverings include, but are not limited to, heat shrink closures and overmolded closures. NAP 40 has a length L. Fiber optic cable assembly 10 further includes at least one tether cable ("tether") 50, also referred to as a "drop cable." Tether 50 has opposite ends 51 and 52 and an interior 53 that carries as least one optical fiber 56, which is referred to hereinafter as a "tether fiber." Tether 50 preferably carries multiple tether fibers 56 arranged in a tether fiber ribbon 60.

Fiber optic cable assembly 10 also includes a splice tube (also called a "carcass") 70 having opposite ends 71 and 72 and an interior 73. Tether 50 is connected to splice tube 70 at end 72 using a heat-shrink member 74. A portion 75 of splice tube 70 at end 71 is secured within or about a portion of flexible covering 44.

Tether 50 preferably terminates in at least one connector 80, and in example embodiments includes one or more connectors within a receptacle, a multiport connection terminal, splice-ready optical fibers, or any other means for optically connecting the tether to other optical fibers, cables or devices. Tether fibers 56 are spliced or otherwise optically connected to preterminated cable fibers 36 that exit cable 20 at NAP 40. The splices or other optical connections are preferably located within splice tube interior 73, as discussed in greater below. In another example embodiment, one or more preselected cable fibers 36 are accessed from ribbon stack 30 and are not preterminated so as to serve as their own "tether fibers." This example embodiment is similar to the preterminated embodiments described below, except that splicing to separate tether fibers 56 is obviated and the preselected cable fibers serve as the tethers.

Distribution cable 20 may be of any type of cable having a cable fiber assembly that would benefit from the present invention. Such distribution cables 20 include, for example, a SST-Ribbon™ Gel-Free Cable available from Corning Cable Systems of Hickory, N.C. This particular cable type includes a helically wound ribbon stack, a pair of strength elements and at least one layer of water-swellable tape all disposed within a cable sheath. This particular cable 20 is considered below by way of illustration in discussing example embodiments of fiber optic cable assembly 10 of the present invention.

Figure 3:
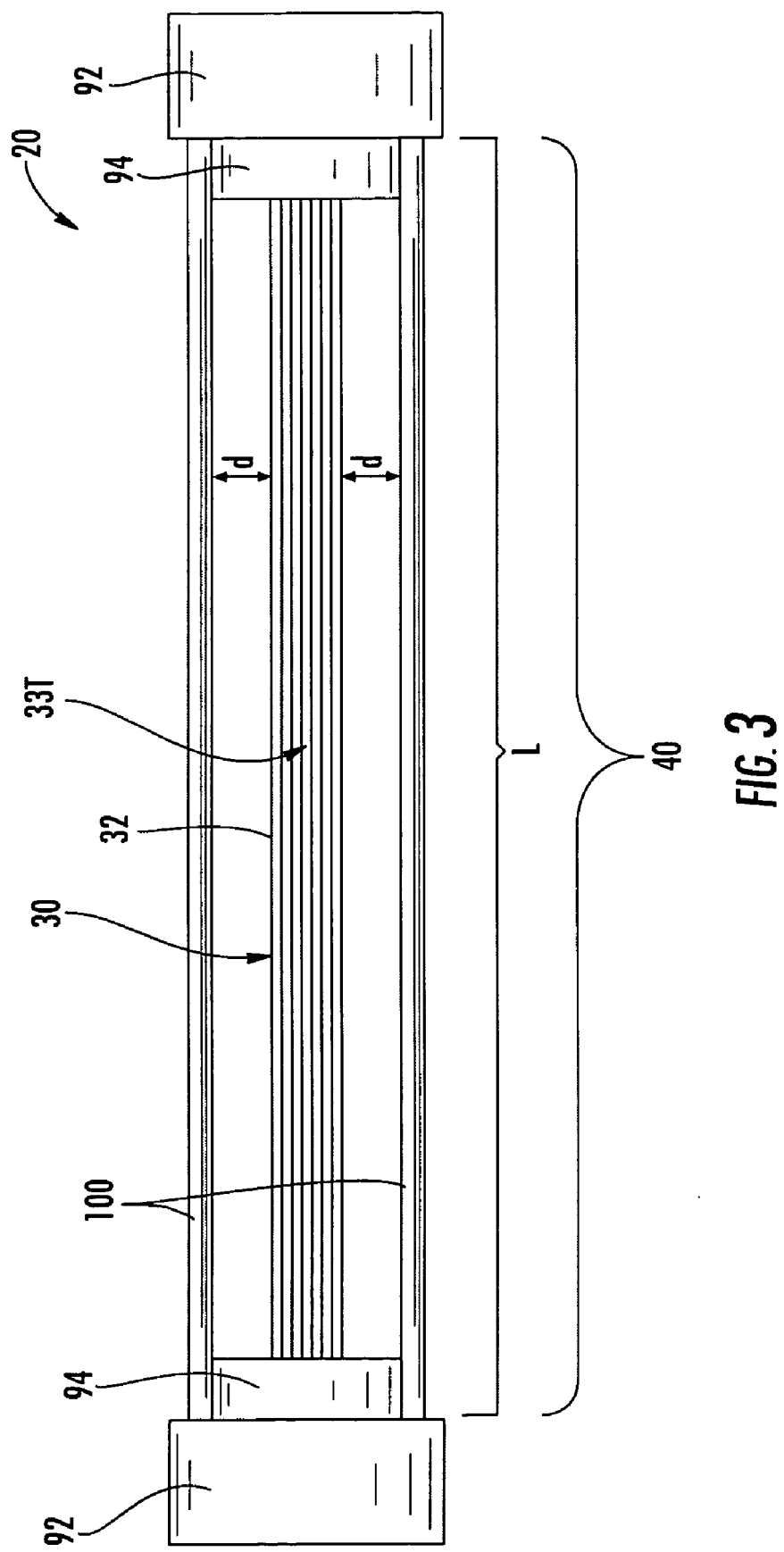
FIG. 3 is a perspective view of a portion of an example ribbon-based distribution cable shown with a portion of the cable sheath, the core tube and the foam tape removed to form the NAP.

An example embodiment of the steps for forming an example fiber optic cable assembly 10 is now illustrated with reference to the fiber optic cable assembly in various stages of construction. The first step in forming fiber optic cable assembly 10 is to choose and prepare a suitable cable 20 for forming the fiber optic cable assembly. FIG. 3 is a schematic diagram of a section of an example distribution cable 20. Distribution cable 20 includes an outer sheath 92 that surrounds a core tube 94, one or more layers of foam tape (not shown) that in turn surround ribbon stack 30. Distribution cable 20 includes at least one strength element. In an example embodiment, distribution cable 20 includes two strength members 100 adjacent respective edges 32 of ribbon stack 30 and located at a distance d therefrom.

FIG. 3 shows cable 20 with a portion of the cable sheath 32, a portion of core tube 94, and a portion of the foam tap layers (not shown) removed to form NAP 40. The length L of NAP 40 is selected to be sufficient to access a select fiber ribbon 34 in ribbon stack 30 and preterminate pre-selected cable fibers 36 in the select fibber ribbon. NAP 40 provides an "access window" to cable 20 and ribbon stack 30 therein that in an example embodiment ranges in length L from about a few inches to more than 12 inches. Strength elements 100 preferably remain uncut at NAP 40.

In forming NAP 40, the foam tape is removed (e.g., via an access tool) up to a certain distance, for example, about 1 meter. Any gel or other material at NAP 40 is also cleaned away. Any cable fibers 36 or fiber ribbons 34 that have been preterminated, or "cut," at other upstream locations (e.g., other NAPs) are removed, leaving only ribbon stack 30 and strength elements 100 exposed at NAP 40. In the event that cable 20 includes conductive strength elements (not shown) that have been severed, electrical continuity is preserved by providing an electrical connection between the conductive strength elements through NAP 40 via a conducting wire (not shown).

Figure 4:
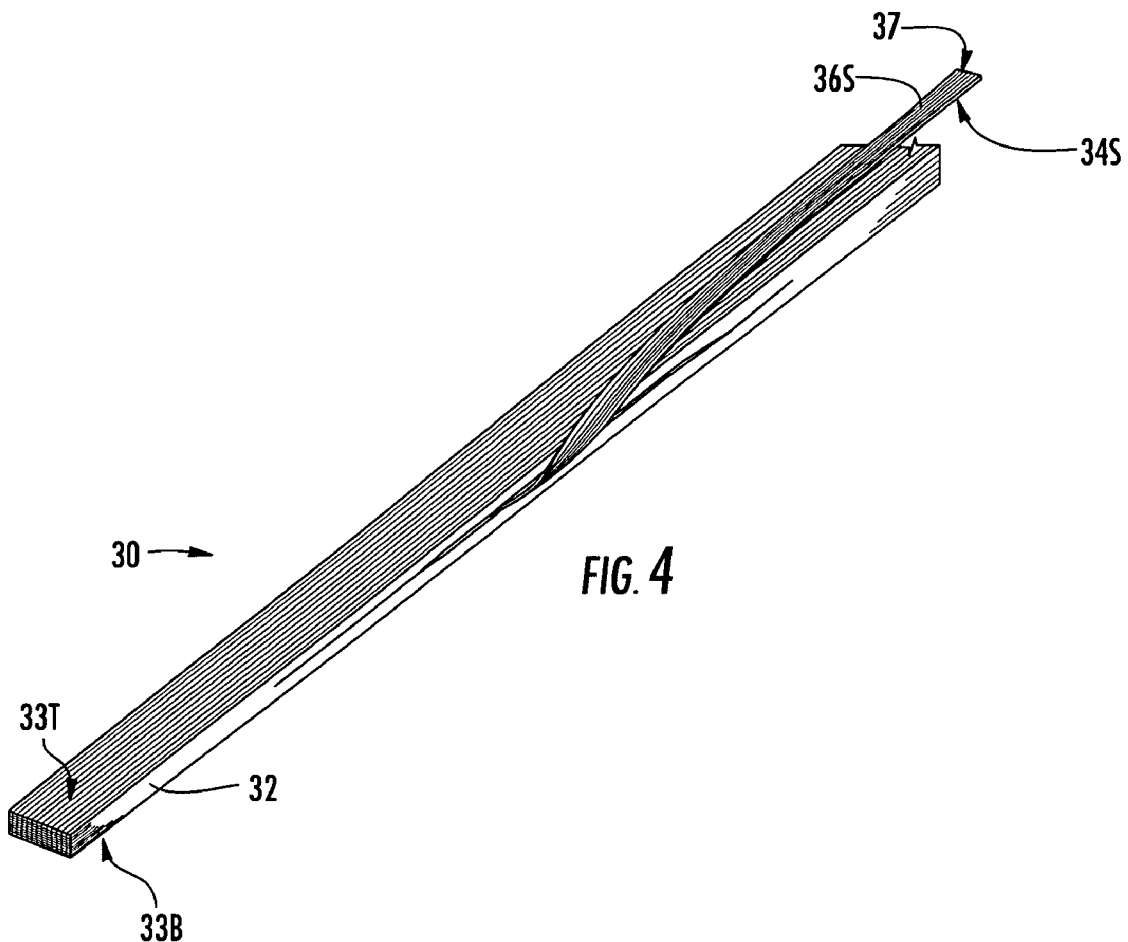
FIG. 4 is a perspective view of the ribbon cable of FIG. 3 illustrating how the splice ribbon section is extracted from the ribbon stack.

FIG. 4 is a close-up perspective view of ribbon stack 30 of NAP 40. The particular fiber ribbon 34 of interest is located in ribbon stack 30 and is accessed, e.g., via an appropriate access tool. The selected fiber ribbon 34 is then typically split into smaller, more easily handled ribbon sections 34S. For example, in the case of a 24-fiber fiber ribbon 34, the fiber ribbon can be split into two 12-fiber ribbon sections 34S. Using tool access techniques, the split is extended a length sufficient to cut the required length of fiber ribbon section 34S to enable splicing cable fibers 36 therein. In example embodiment, the length of the split (i.e., the length of fiber ribbon section 34S) is about 8 to 12 inches. In an example embodiment, fiber ribbon section 34S is intended to be spliced to tether fibers 56 and so is hereinafter referred to as the "splice ribbon section." Likewise, the cable fibers 36 in fiber ribbon section 34S are hereinafter referred to as "splice cable fibers" 36S.

Figure 5:
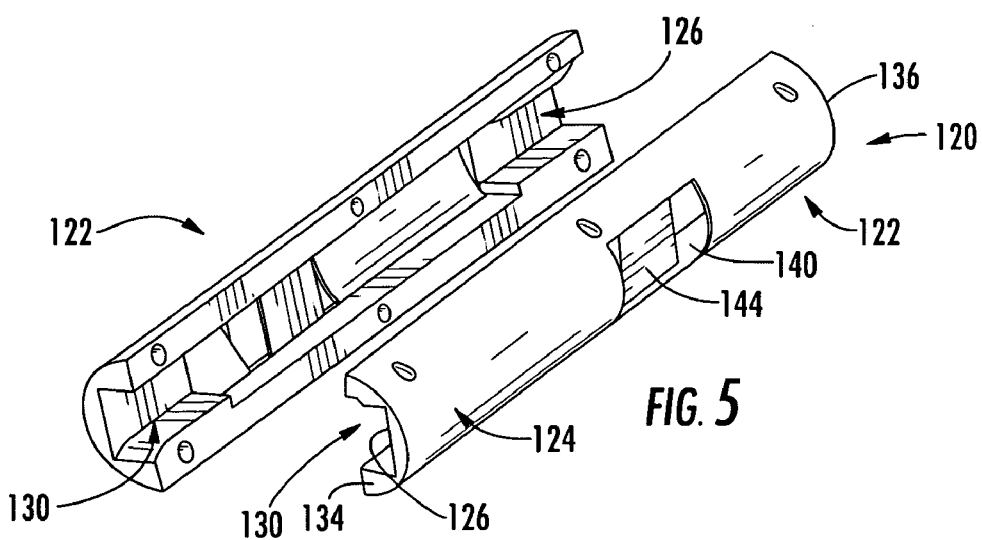
FIG. 5 is a perspective view of an example transition assembly used to secure the ribbon stack and the splice ribbon section.

Once cut, splice ribbon section 34S is isolated and ribbon stack 50 secured. In an example embodiment, securing ribbon stack 50 is accomplished using a transition assembly. FIG. 5 is a perspective view of an example transition assembly 120. In an example embodiment, transition assembly 120 includes two identical cylinder halves 122 each having an outer surface 124 and an inner surface 126. Inner surface 126 includes an open central channel 130 formed in the inner surface and open at opposite ends 134 and 136. Each cylinder half 122 also has an aperture 140 about halfway between ends 134 and 136 and open to central channel 130. A plate section 144 resides adjacent aperture 140 just below inner surface 126 and is sized to support splice ribbon section 34S. When cylinder halves 122 are put together, open central channels 130 come together to form a closed central channel 150 sized to accommodate ribbon stack 30.

Thus, with reference now also to FIG. 6, one cylinder half 122 is placed around a portion of ribbon stack 30 within NAP 40 so that half the ribbon stack portion is contained in open central channel 130. Splice ribbon section 34S, which runs along the opposite edge 32 of ribbon stack 50, is twisted so that it can be threaded over plate section 144 of the other cylinder half 122 to lie atop the ribbon stack top surface 33T.

With reference now to FIG. 7, once the other cylinder half 122 is placed in proximity to the other cylinder half and splice ribbon section 34S is threaded over plate section 144, the two cylinder halves 122 are brought together to enclose ribbon stack 30 and splice ribbon section 34S within closed central channel 150. This serves to hold splice ribbon section 34S in a select position relative to ribbon stack 30, such as on top surface 33T and thus in a plane parallel to the plane of fiber ribbons 34 in the ribbon stack.

Figure 8:
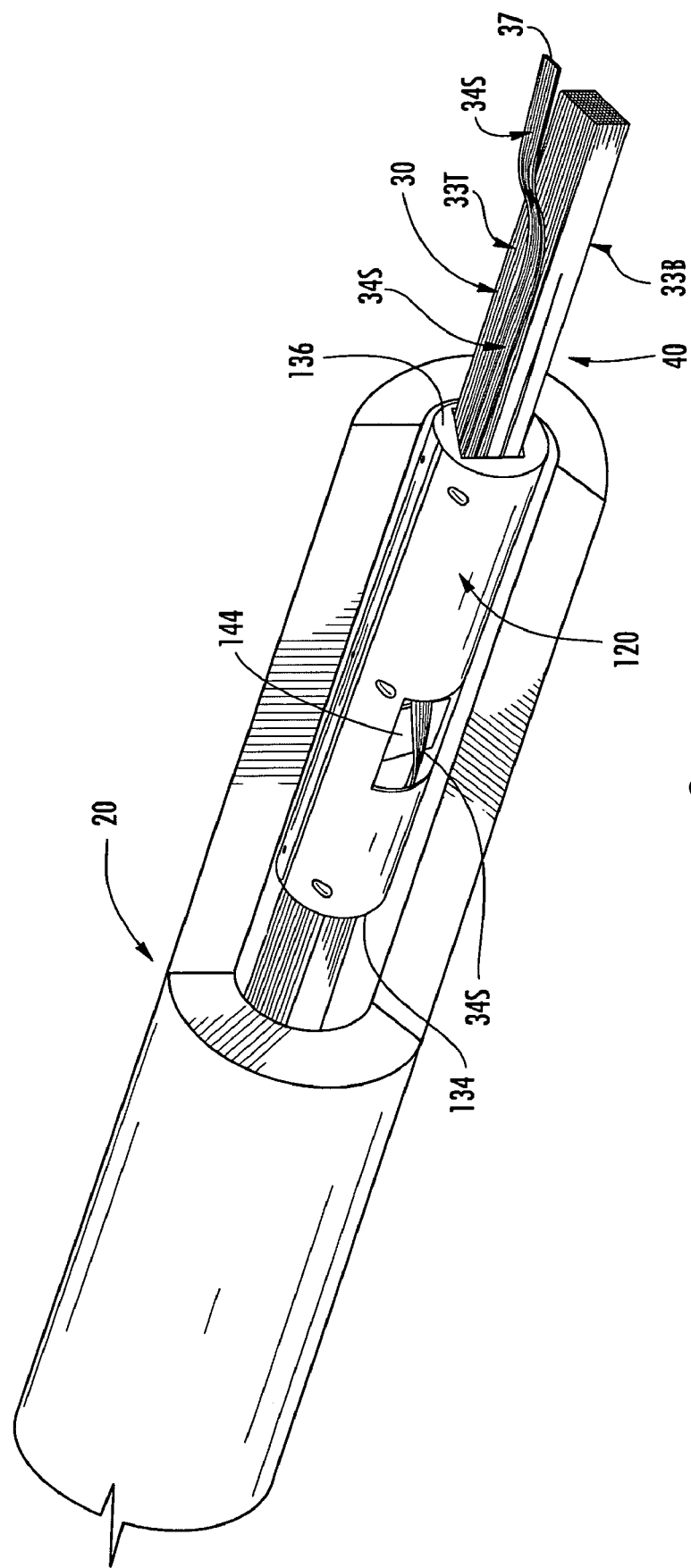
FIG. 8 is a perspective view of the distribution cable at one end of the NAP, showing how the transition assembly is moved from the NAP up into the distribution cable.

With reference now to FIG. 8, once transition assembly 120 is configured to hold ribbon stack 30 and splice ribbon section 34S as discussed above, the assembly is either pushed up into core tube 94 where it allows the stack to translate slightly as shown in FIG. 8, or it is secured within the overmolded, translatable tap as discussed below. Either way, the function of transition assembly 120 is to protect splice ribbon section 34S as it exits from within ribbon stack 30 by not allowing any direct bending of that specific point of cable 20 and not allowing the bend properties of the splice ribbon section to be violated. The end result is a ribbon stack 30 with all ribbons parallel to the bending plane but with splice ribbon section 34S now atop the ribbon stack on top surface 33T. In FIG. 8, strength elements 100 are omitted for ease of illustration.

Figure 9:
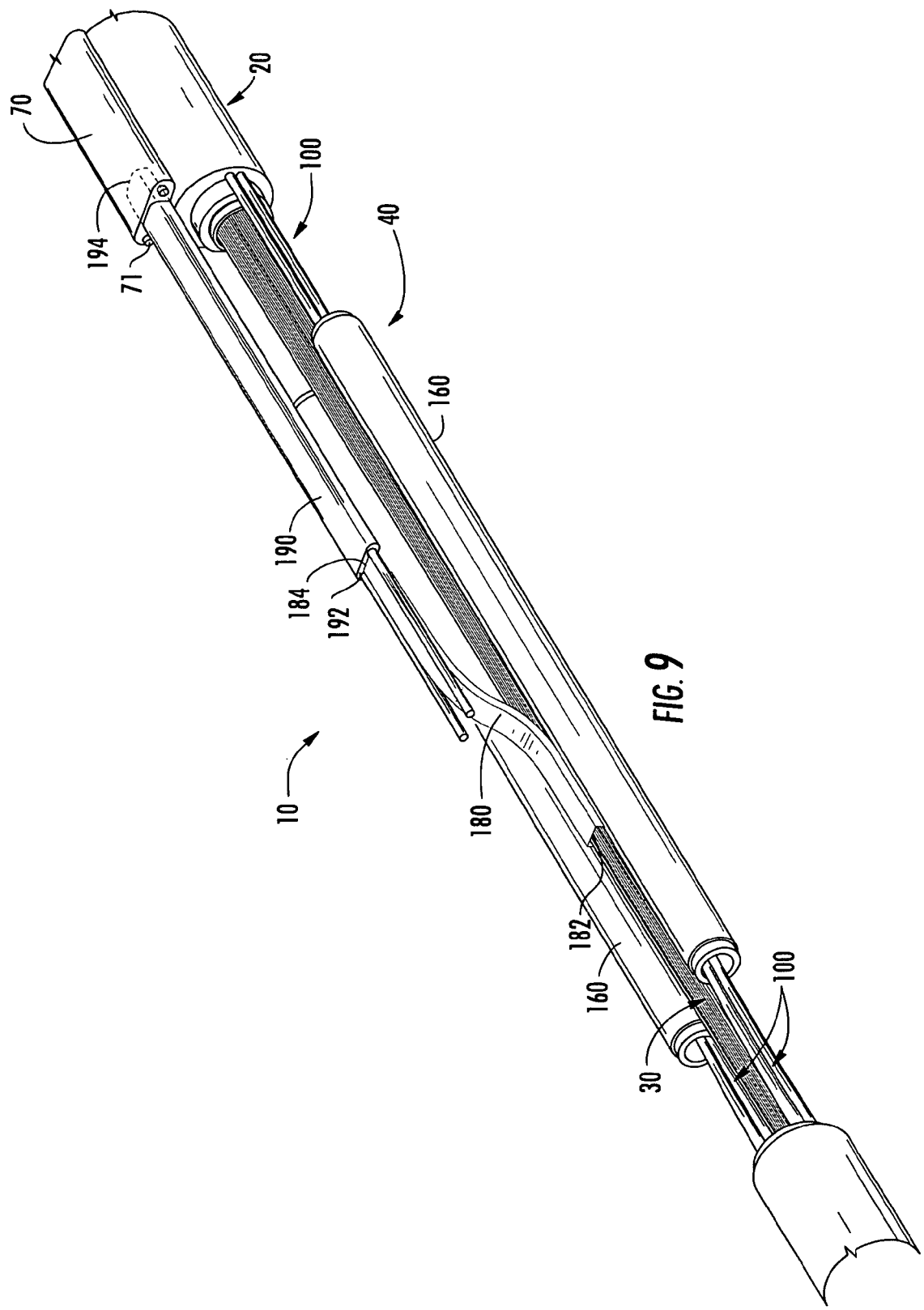
FIG. 9 is a perspective view of the fiber optic cable assembly under construction, showing the addition of the buffer conduit, the movable members over the strength members, and the intermediate guide tube connected to the splice tube.

FIG. 9 is a perspective view of fiber optic cable assembly 10 under construction and illustrates an example embodiment wherein a buffer conduit 180 with input and output ends 182 and 184 is installed over an end portion of splice ribbon section 34S at end 3. In an example embodiment, the length splice ribbon section 34S within buffer conduit 180 is from about 7 inches to about 10 inches. Buffer conduit 180 serves to support splice ribbon section 34S rather than leaving the splice ribbon fiber section loose within NAP 40. Buffer conduit 180 is sized so that splice ribbon section 34S is loosely confined therein and so that the splice ribbon section can move within the buffer conduit. In an example embodiment, buffer conduit 180 is curved to control the bending of splice ribbon section 34S and provide a controlled path from ribbon stack 30 within NAP 40 to outside of the NAP. Splice ribbon section 34S extends beyond buffer conduit output end 184 so that it can be spliced to tether fiber ribbon 60, as discussed below.

With continuing reference to FIG. 9, fiber optic cable assembly 10 further includes two movable members 160 installed around respective strength members 100. In an example embodiment, movable members 160 are sleeves or metallic crimp-on split tubes. In an example embodiment, tape 164 (e.g., self-healing tape) is wrapped around each movable member to seal them to their respective strength members 100. Movable members 160 are configured so that they can move relative to strength members 100, e.g., slide back and forth thereover.

As also shown in FIG. 9, fiber optic cable assembly 10 further includes an intermediate guide tube 190 having input and output end 192 and 194. Buffer conduit 180 is connected at its output end 184 to the input end 192 of intermediate guide tube 190. In an example embodiment, buffer conduit output end 184 slides into intermediate guide tube input end 192 and the two tubes are then joined together, e.g., with heat-shrink material (not shown). Intermediate guide tube 190 is coupled at its output end 194 to input end 71 of splice tube 70. Intermediate guide tube 190 is configured to be translatable relative to splice tube 70. In an example embodiment, output end 194 of intermediate guide tube 190 extends into input end 71 of splice tube 70 and into interior 73 thereof, and can slide back and forth therein. A portion of splice ribbon section 34S thus ultimately travels through buffer conduit 180, through intermediate guide tube 190 and into interior 73 of splice tube 70.

Figure 10:
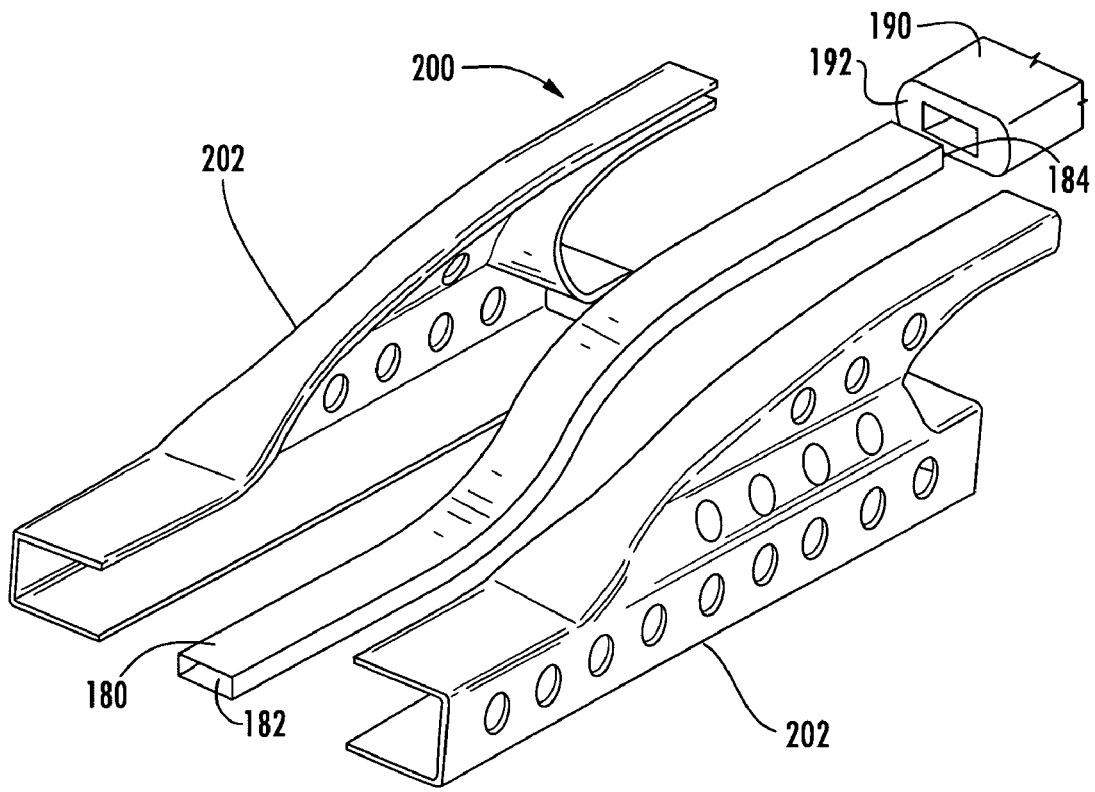
FIG. 10 is a perspective view of an example buffer conduit guide that includes two halves that surround the buffer conduit as an optional means of providing additional support of the buffer conduit within the NAP.

With reference now to FIG. 10, in an example embodiment, a buffer conduit guide 200 comprised of two matching halves 202 is optionally closed around buffer conduit 180 and optionally an end portion of intermediate guide tube 190 at end 192 to provide additional structural support. Buffer conduit guide 200 can be secured by a strap (not shown) to movable members 114. The attitude of splice ribbon section 34S and buffer conduit 180 as it leaves buffer conduit guide 200 should be about parallel to a long axis of distribution cable 20. The embodiments of fiber optic cable assembly 10 described below do not employ optional buffer conduit guide 200.

Figure 11:
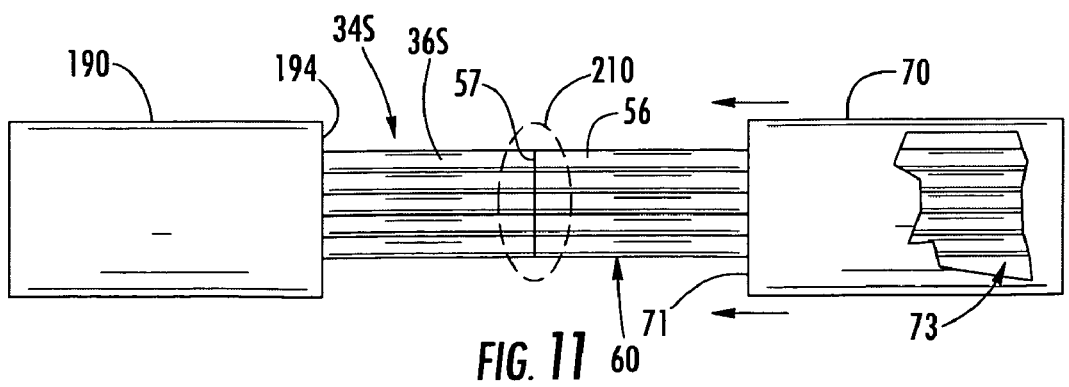
FIG. 11 is a perspective view of the fiber ribbon section extending from the intermediate guide tube and showing the cable fibers therein spliced to corresponding tether fibers in a tether fiber ribbon prior to the splice tube covering the splices and being connected to the intermediate guide tube.
Figure 12:
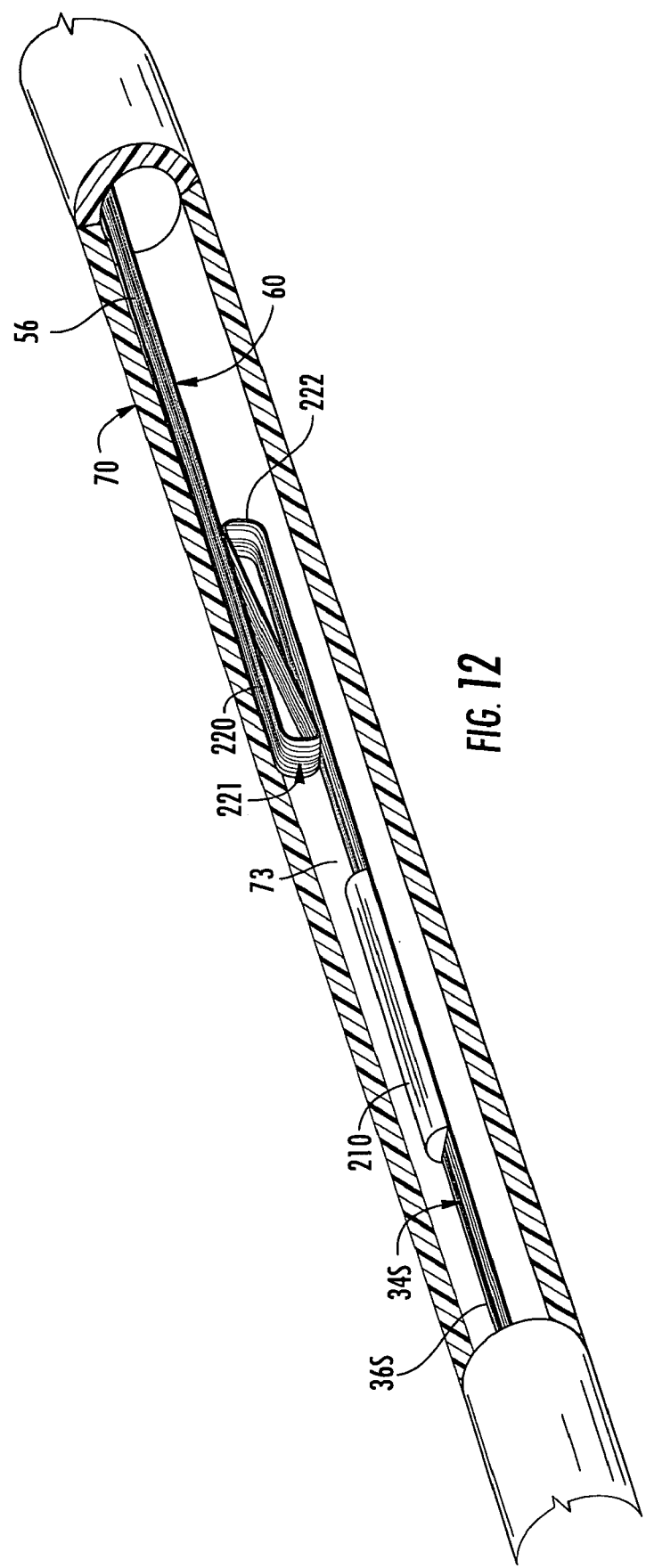
FIG. 12 is a close-up cut-away view of the splice tube illustrating an example embodiment wherein the tether fiber ribbon is formed from bend-insensitive fibers and has a coil or loop formed within the splice tube interior.

With reference now to FIG. 11, prior to connecting intermediate guide tube 190 to splice tube 70 and connecting the splice tube to tether 50, in an example embodiment, splice cable fibers 36S in splice ribbon section 34S are spliced at their ends 37 to corresponding tether fibers 56 at their ends 57S, thereby forming splices 210. Once splices 210 are so formed, splice tube 70 and intermediate guide tube 190 are operably coupled as described above so that splices 210 reside within splice tube interior 73. Likewise, splice tube 70 is coupled to tether 50 via heat shrink member 74 as described above (FIG. 1). In the case of a bend performance tether fibers 56, a 360 degree slack loop or coil (e.g., an S-shaped coil) 220 with bends 221 and 222 may be made in tether fiber ribbon 60, as shown in FIG. 12. Coil 220 can change shape, with bends 221 and 222 moving towards or away from each other, as fiber ribbon section 34S and tether ribbon 60 connected thereto translates.

It is noted here that in the example embodiment where splice ribbon section 34S is sufficiently long so as to serve at a tether, the splice ribbon section (which would be called a "tether ribbon section" at this point) would extend through intermediate guide tube 190 and "splice" tube 70 to form connectorized tether cable 50.

Figure 13:
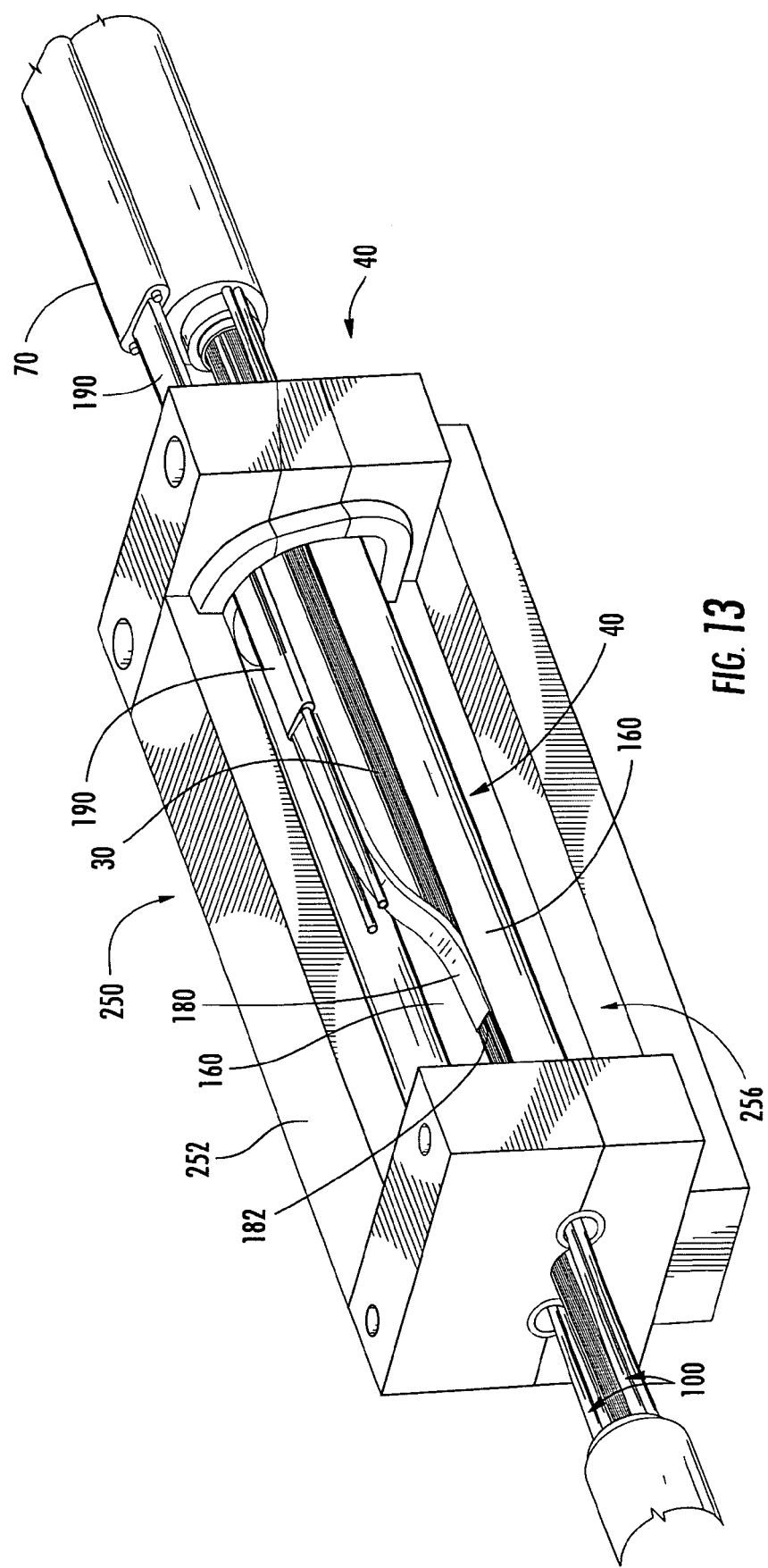
FIG. 13 is a perspective view the fiber optic cable assembly under construction similar to FIG. 9 but showing one half of a mold placed over the components within the NAP.
Figure 14:
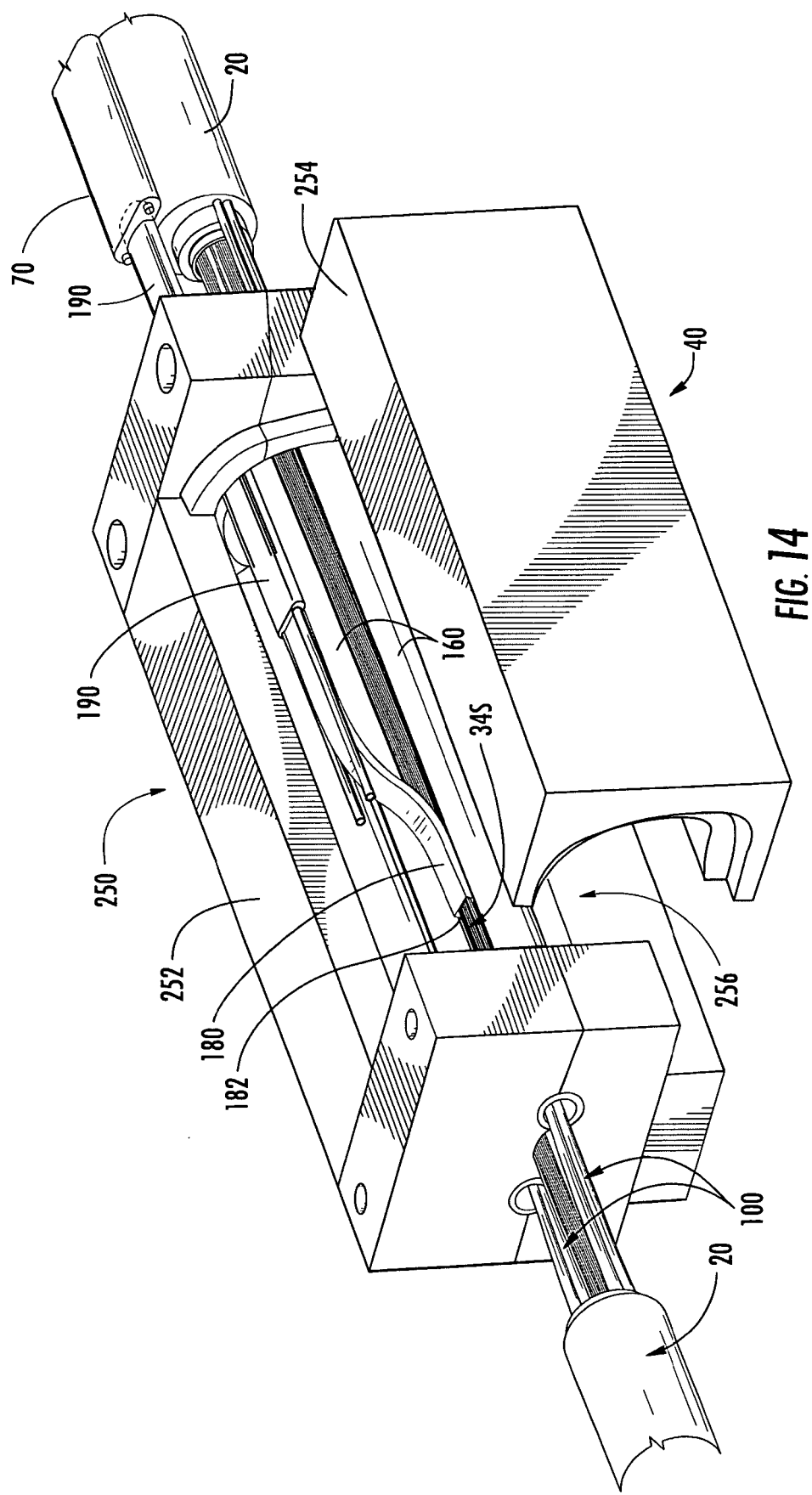
FIG. 14 is similar to FIG. 13 but showing both halves of the mold in position in anticipation of adding bonding material to the mold.

With reference now to FIGS. 13 and 14, a mold 250 having mold sections 252 and 254 that define a cavity 256 is arranged around NAP 40 so that movable members 160, ribbon stack 30 and splice ribbon section 34S all pass through the cavity. Also, buffer conduit 180 and a portion of intermediate guide tube 190 also reside in mold cavity 252. Mold cavity 252 is then filled with a bonding material such as an elastomer (e.g., a urethane). Bonding material contacts edges 32 and the top and bottom surfaces 33T and 33B of ribbon stack 30, and preferably does not go in between fiber ribbons 52—that is to say, the bonding material preferably "edge-bonds" to ribbon stack 30.

Figure 15:
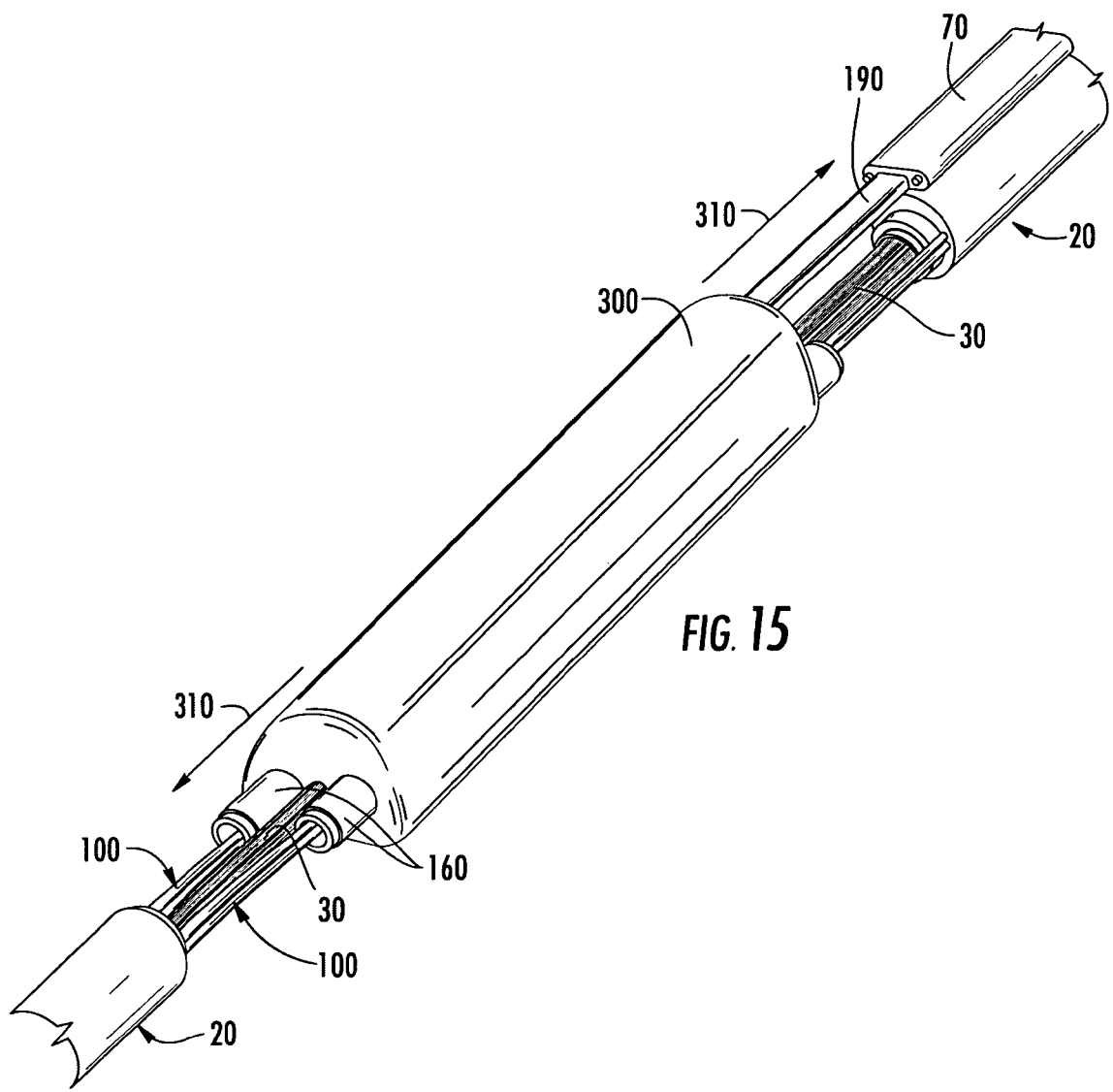
FIG. 15 is a perspective view of the fiber optic cable assembly with the mold removed to show the resultant translatable bonding structure.

When the bonding material in mold 250 hardens or otherwise cures to the point where it retains its shape, the mold is removed. With reference to FIG. 15, the result is bonding structure 300 bonds the aforementioned elements that were within cavity 256. In particular, bonding structure 300 bonds to edges 32 and top and bottom surfaces 33T and 33B of ribbon stack 30 but does not bond any ribbon faces internal to the ribbon stack. Bonding structure 300 serves to immobilize fiber ribbons 34 in ribbon stack 30 as well as buffer conduit 180, the end portion of intermediate guide tube 190, and movable members 160 relative to one another.

However, movable members 160 remain movable over strength members 100, so that splice ribbon section 34S can move within buffer conduit 180 and within intermediate guide tube 190, the end 194 of which is translatable within splice tube 70. Thus, the portion of fiber optic cable assembly 10 held by bonding structure 300 can translate as a whole within NAP 40 (arrows 310) along the length of cable 20, thereby forming a "floating" tap. At the same time, the portion of fiber optic cable assembly 10 held by bonding structure 300 is prevented from rotating. This provides the needed latitude for ribbon stack 30 and splice ribbon section 34S to translate within the NAP as cable 20 is being stored, deployed, and/or otherwise moved or adjusted.

Figure 16:
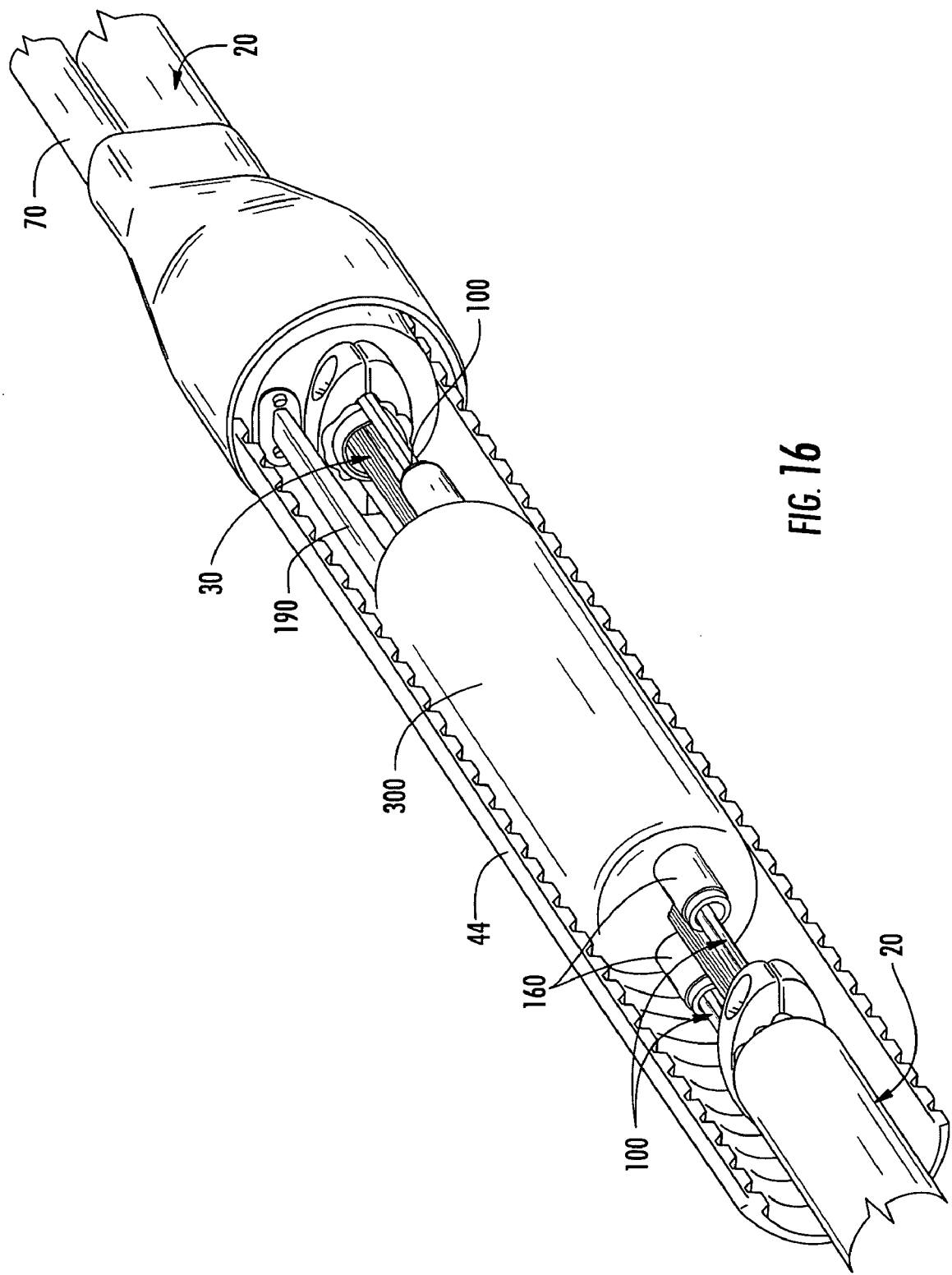
FIG. 16 is similar to FIG. 15 but showing the addition of a flexible NAP cover.

FIG. 16 shows NAP 40 of FIG. 15 but further including flexible armored cover 44 that covers the NAP.

Fiber Optic Cable Assembly Materials

In various embodiments, the cable assemblies, components and bonding materials may include flame retardant additives as required in indoor applications. Specifically, the cable assemblies preferably meet or exceed the UL1666 flame test for riser applications, a test for flame propagation height of electrical and optical fiber cables installed vertically in shafts. The cable assemblies also preferably meet or exceed the NFPA 262 flame test, the standard method of test for flame travel and smoke of wires and cables for use in air-handling spaces. The cable assemblies may include OFNR interior cables that do not contain electrically conductive components and which are certified for use in riser applications to prevent the spread of fire from floor to floor in an MDU and are ANSI/UL 1666-1997 compliant. The cable assemblies may be LSZH (low smoke zero halogen) compliant and do not produce a Halogen gas when burned.

Optical Fiber Types

In the various embodiments described herein, one or more of cable fibers 36 of cable 20 and/or one or more of tether fibers 56 of tether 50 may comprise any optical fiber type including, but not limited to, single mode, multi-mode, bend-performance fiber, bend-optimized fiber and bend-insensitive optical fiber. Fiber types may include nano-engineered fibers having a core region and a cladding region surrounding the core region, the cladding region comprising an annular hole-containing region comprised of non-periodically disposed holes such that the optical fiber is capable of single mode transmission at one or more wavelengths in one or more operating wavelength ranges. The core region and cladding region provide improved bend resistance, and single mode operation at wavelengths preferably greater than or equal to 1500 nm, in some embodiments also greater than about 1310 nm, in other embodiments also greater than 1260 nm. The optical fibers provide a mode field at a wavelength of 1310 nm preferably greater than 8.0 microns, more preferably between about 8.0 and 10.0 microns. In preferred embodiments, optical fiber disclosed herein is thus single-mode transmission optical fiber.

In some embodiments, the nano-engineered optical fibers used in the present invention comprises a core region disposed about a longitudinal centerline, and a cladding region surrounding the core region, the cladding region comprising an annular hole-containing region comprised of non-periodically disposed holes, wherein the annular hole-containing region has a maximum radial width of less than 12 microns, the annular hole-containing region has a regional void area percent of less than about 30 percent, and the non-periodically disposed holes have a mean diameter of less than 1550 nm.

By "non-periodically disposed" or "non-periodic distribution", it is meant that when one takes a cross-section (such as a cross-section perpendicular to the longitudinal axis) of the optical fiber, the non-periodically disposed holes are randomly or non-periodically distributed across a portion of the fiber. Similar cross sections taken at different points along the length of the fiber will reveal different cross-sectional hole patterns, i.e., various cross-sections will have different hole patterns, wherein the distributions of holes and sizes of holes do not match. That is, the holes are non-periodic, i.e., they are not periodically disposed within the fiber structure. These holes are stretched (elongated) along the length (i.e. in a direction generally parallel to the longitudinal axis) of the optical fiber, but do not extend the entire length of the entire fiber for typical lengths of transmission fiber.

For a variety of applications, it is desirable for the holes to be formed such that greater than about 95% of and preferably all of the holes exhibit a mean hole size in the cladding for the optical fiber which is less than 1550 nm, more preferably less than 775 nm, most preferably less than 390 nm. Likewise, it is preferable that the maximum diameter of the holes in the fiber be less than 7000 nm, more preferably less than 2000 nm, and even more preferably less than 1550 nm, and most preferably less than 775 nm. In some embodiments, the fibers disclosed herein have fewer than 5000 holes, in some embodiments also fewer than 1000 holes, and in other embodiments the total number of holes is fewer than 500 holes in a given optical fiber perpendicular cross-section. Of course, the most preferred fibers will exhibit combinations of these characteristics. Thus, for example, one particularly preferred embodiment of optical fiber would exhibit fewer than 200 holes in the optical fiber, the holes having a maximum diameter less than 1550 nm and a mean diameter less than 775 nm, although useful and bend resistant optical fibers can be achieved using larger and greater numbers of holes. The hole number, mean diameter, max diameter, and total void area percent of holes can all be calculated with the help of a scanning electron microscope at a magnification of about 800× and image analysis software, such as ImagePro, which is available from Media Cybernetics, Inc. of Silver Spring, Md., USA.

The optical fibers used herein may or may not include germania or fluorine to also adjust the refractive index of the core and or cladding of the optical fiber, but these dopants can also be avoided in the intermediate annular region and instead, the holes (in combination with any gas or gases that may be disposed within the holes) can be used to adjust the manner in which light is guided down the core of the fiber. The hole-containing region may consist of undoped (pure) silica, thereby completely avoiding the use of any dopants in the hole-containing region, to achieve a decreased refractive index, or the hole-containing region may comprise doped silica, e.g. fluorine-doped silica having a plurality of holes.

Additional description of nano-engineered fibers used in the present invention are disclosed in pending U.S. patent application Ser. No. 11/583,098, filed Oct. 18, 2006; U.S. patent application Ser. No. 12/004,174, filed Dec. 20, 2007; in pending U.S. provisional patent application Ser. No. 60/817,863, filed Jun. 30, 2006; in U.S. provisional patent application Ser. No. 60/817,721, filed Jun. 30, 2006; in U.S. provisional patent application Ser. No. 60/841,458, filed Aug. 31, 2006; in U.S. provisional patent application Ser. No. 60/876,266, filed Dec. 21, 2006; and in U.S. provisional patent application Ser. No. 60/879,164, filed Jan. 8, 2007, all of which are assigned to Corning Incorporated and each application is respectively incorporated herein by reference.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A fiber optic cable assembly, comprising:
a fiber optic cable that carries at least one strength member and a cable fiber assembly comprising a plurality of cable fibers;
at least one network access point (NAP) positioned along the fiber optic cable at which at least a portion of at least one cable fiber is confined within a buffer conduit, and wherein at least one movable member is operatively associated with the at least one strength member; and
a structure formed within the NAP and configured to inhibit rotation of the cable fiber assembly relative to the fiber optic cable while allowing for cable fiber assembly translation relative to the fiber optic cable within the NAP.

2. The fiber optic cable assembly of claim 1, wherein the structure is a bonding structure associated with the at least one movable member, the buffer conduit and the cable fiber assembly.

3. The fiber optic cable assembly of claim 1, wherein the cable fiber assembly comprises a ribbon stack, and the at least one cable fiber comprises a fiber ribbon section of the ribbon stack.

4. The fiber optic cable assembly of claim 1, wherein the cable fiber assembly comprises buffer tubes that each include at least one cable fiber.

5. The fiber optic cable assembly of claim 1, wherein the at least one of the plurality of cable fibers is preterminated.

6. The fiber optic cable assembly of claim 1, wherein the structure configured to inhibit rotation is at least partially formed from an elastomeric material.

7. The fiber optic cable assembly of claim 1, further including a guide connected to the buffer conduit and partially enclosed within the structure configured to inhibit rotation.

8. The fiber optic cable assembly of claim 7, wherein the at least one of the plurality of cable fibers is preterminated, and further including a splice tube having an interior and connected to the intermediate guide tube such that the intermediate guide tube is moveable relative thereto.

9. The fiber optic cable assembly of claim 8, further including a tether having at least one tether fiber, and wherein the at least one tether fiber is spliced in the splice tube interior to the at least one cable fiber.

10. The fiber optic cable assembly of claim 9, wherein the tether includes an end having at least one connector.

11. The fiber optic cable assembly of claim 9, wherein the at least one of the plurality of cable fibers comprises a plurality of preterminated cable fibers in ribbon form, and the tether includes a plurality of tether fibers in ribbon form.

12. The fiber optic cable assembly of claim 9, wherein at least one of the tether fibers is a bend-insensitive fiber.

13. The fiber optic cable assembly of claim 1, further including a transition assembly that secures the at least one of the plurality of cable fibers atop the cable fiber assembly at an output end of the transition assembly.

14. The fiber optic cable assembly of claim 13, wherein the transition assembly is located relative to the NAP so as not to be included in the structure.

* * * * *